US008839837B2

(12) United States Patent
Takeuchi et al.

(10) Patent No.: US 8,839,837 B2
(45) Date of Patent: Sep. 23, 2014

(54) DEVICE AND METHOD FOR OPTICAL CABLE INSTALLATION

(75) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 268 days.

(21) Appl. No.: 13/352,688

(22) Filed: Jan. 18, 2012

(65) Prior Publication Data

US 2013/0098557 A1   Apr. 25, 2013

Related U.S. Application Data

(60) Provisional application No. 61/550,722, filed on Oct. 24, 2011.

(51) Int. Cl.
*B32B 37/14* (2006.01)
*B65H 35/00* (2006.01)

(52) U.S. Cl.
CPC .......... *B65H 35/004* (2013.01); *B65H 2701/32* (2013.01)
USPC .............................. 156/574; 156/71; 156/577

(58) Field of Classification Search
USPC .................................. 156/71, 574, 577, 579
See application file for complete search history.

(56) References Cited

U.S. PATENT DOCUMENTS

| | | | | |
|---|---|---|---|---|
| 3,008,167 A | * | 11/1961 | Pharris et al. | 15/230.11 |
| 3,089,535 A | | 5/1963 | Vohrer et al. | |
| 3,717,899 A | * | 2/1973 | Gardner et al. | 15/230.11 |
| 3,970,396 A | * | 7/1976 | Brady | 401/208 |
| 4,261,783 A | * | 4/1981 | Finke | 156/384 |
| 4,459,165 A | | 7/1984 | Meis et al. | |
| 4,521,767 A | * | 6/1985 | Bridge | 340/555 |
| 4,911,525 A | * | 3/1990 | Hicks et al. | 385/114 |
| 5,211,784 A | * | 5/1993 | Haibach et al. | 156/71 |
| 5,462,633 A | | 10/1995 | Manusch et al. | |
| 5,868,900 A | | 2/1999 | Haglund | |
| 8,574,385 B2 | * | 11/2013 | Malofsky et al. | 156/71 |
| 2012/0020635 A1 | * | 1/2012 | Hendrickson et al. | 385/135 |

* cited by examiner

*Primary Examiner* — Mark A Osele
(74) *Attorney, Agent, or Firm* — Lerner, David, Littenberg, Krumholz & Mentlik, LLP

(57) ABSTRACT

An apparatus is provided for securing an optical cable unit to one or more surfaces. The optical cable unit includes a length of adhesive tape and a length of optical cable. The apparatus includes a housing having an outlet and an adjustable securing portion disposed adjacent the outlet. The adjustable securing portion has first and second surface portions configured to adjust between first and second positions. The surface portions form a first angle therebetween in the first position and a second angle therebetween in the second position. The adjustable securing portion may be selectively attachable to the housing. A system is provided and can include a housing and at least two adjustable securing portions. Also provided is a separate adjustable securing portion adapted for use with an apparatus, and a method of applying an optical cable unit to one or more surfaces.

11 Claims, 14 Drawing Sheets

DEVICE AND METHOD FOR OPTICAL CABLE INSTALLATION

CROSS-REFERENCE TO RELATED APPLICATIONS

The present application claims the benefit of the filing date of U.S. Provisional Patent Application No. 61/550,722 filed Oct. 24, 2011, the disclosure of which is hereby incorporated herein by reference.

BACKGROUND OF THE INVENTION

The present invention generally relates to an apparatus for securing an optical cable unit to one or more surfaces. More particularly, the present invention relates to an apparatus that more accurately and securely dispenses an optical cable unit onto one or more surfaces that may be curved or angled with respect to one another.

Optical cables are typically manufactured such that they cannot be bent at a sharp ninety degree angle, such as that of a corner junction between two walls or surfaces, without reducing or inhibiting the transmissivity of the cable. In some instances, optical cables bent at sharp ninety degree angles can even break. Furthermore, optical cables are often installed in a manner that requires that they be secured to a wall or at an intersection between two walls. Placement of the cable and use of a securing means, such as an adhesive tape, to secure the cable thereafter can be a cumbersome and tedious process. Therefore, a need exists for a method and tooling for passing an optical cable around a corner junction between two surfaces and for installing an optical cable along an intersection between two surfaces that preserves the integrity and performance of the optical cable. A need also exists for a method of applying and securing the optical cable to the surfaces.

BRIEF SUMMARY OF THE INVENTION

A first aspect of the present invention is an apparatus for securing an optical cable unit to one or more surfaces, the optical cable unit including a length of adhesive tape and a length of optical cable. The apparatus includes a housing and an adjustable securing portion. The housing has an outlet at which the adhesive tape can be provided for output from the housing. The adjustable securing portion is disposed adjacent the outlet for securing the optical cable unit to one or more surfaces and has first and second surface portions configured to adjust between first and second positions. The first and second surface portions form a first angle therebetween in the first position and a second angle therebetween in the second position. The second angle is different than the first angle.

In accordance with certain embodiments of this first aspect, the first angle may be substantially 90 degrees or 180 degrees when the adjustable securing portion is in the first position in a resting state. The adjustable securing portion may include a spring mechanism to bias the first and second surface portions to assume the first position in a resting state. The first and second surface portions may be spaced apart to form a gap therebetween. The adjustable securing portion may be configured to transition from the first position to the second position when the adjustable securing portion is forced into contact with one or more surfaces. The second angle may be substantially equal to an angle between two surfaces upon which the optical cable unit is dispensed. The adjustable securing portion may be selectively attachable to the housing. The first and second surface portions may be substantially planar pads. The first and second surface portions may be portions of first and second substantially cylindrical rollers, respectively. The adjustable securing portion may include first and second axles on which the first and second substantially cylindrical rollers, respectively, are mounted for rotation.

A second aspect of the present invention is a system for securing an optical cable unit to one or more surfaces, the optical cable unit including a length of adhesive tape and a length of optical cable. The system includes a housing and at least two adjustable securing portions. The housing has an outlet at which the adhesive tape can be provided for output from the housing. The at least two adjustable securing portions are each selectively attachable to the housing at a position adjacent the outlet for securing the optical cable unit to one or more surfaces. At least one of the adjustable securing portions has first and second surface portions configured to adjust between first and second positions. The first and second surface portions form a first angle therebetween in the first position and a second angle therebetween in the second position. The second angle is different than the first angle.

In accordance with certain embodiments of this second aspect, a first of the adjustable securing portions may have first and second surface portions configured to adjust between the first and second positions, and a second of the adjustable securing portions may include first and second surface portions forming a fixed angle therebetween of substantially 180 degrees. The first angle of a first of the adjustable securing portions may be substantially 90 degrees when the first adjustable securing portion is in the first position in a resting state, and the first angle of a second of the adjustable securing portions may be substantially 180 degrees when the second adjustable securing portion is in the first position in a resting state.

A third aspect of the present invention is an adjustable securing portion adapted for use with an apparatus for securing an optical cable unit to one or more surfaces, the optical cable unit including a length of adhesive tape and a length of optical cable. The adjustable securing portion includes first and second surface portions configured to adjust between first and second positions. The first and second surface portions form a first angle therebetween in the first position and a second angle therebetween in the second position. The second angle is different than the first angle. The adjustable securing portion is selectively attachable to the apparatus for securing the optical cable unit to one or more surfaces.

In accordance with certain embodiments of this third aspect, the first and second surface portions may be portions of first and second substantially cylindrical rollers, respectively. The adjustable securing portion may include first and second axles on which the first and second substantially cylindrical rollers, respectively, are mounted for rotation.

A fourth aspect of the present invention is a method of applying an optical cable unit to one or more surfaces, the optical cable unit including a length of adhesive tape and a length of optical cable. The method includes the steps of passing a leading end of the length of optical cable through an outlet of a housing within which a portion of the length of adhesive tape is aligned with a portion of the length of optical cable to form the optical cable unit, adhering a portion of the optical cable unit to the one or more surfaces, and pressing first and second surface portions of an adjustable securing portion disposed adjacent the outlet against portions of the adhesive tape directly in contact with the one or more surfaces to cause the adjustable securing portion to transition from a first position to a second position, wherein the first and second surface portions form a first angle therebetween in the first position and a second angle different than the first angle therebetween in the second position.

In accordance with certain embodiments of this fourth aspect, the second angle of the second position may be substantially equal to an angle between two surfaces upon which the optical cable unit is secured. The step of pressing may include moving the first and second surface portions against a bias of a spring mechanism that forces the first and second surface portions to assume the first position in a resting state. The step of pressing may include aligning a gap between the first and second surface portions with the optical cable. The method may further include the step of attaching the adjustable securing portion adjacent the outlet of the housing. The method may further include the step of selecting one of at least two adjustable securing portions for attachment with the housing. The first and second surface portions may be portions of first and second substantially cylindrical rollers, respectively, and the step of pressing may include rolling the rollers along the portions of the adhesive tape directly in contact with the one or more surfaces.

DETAILED DESCRIPTION

Figure 1:
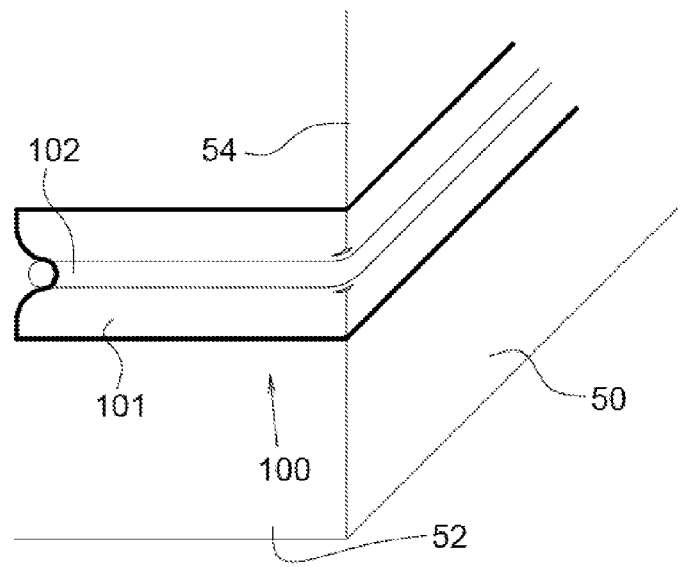
FIG. 1 is a perspective view an optical cable unit secured around a corner junction of two walls.

As shown in FIG. 1, an optical cable unit 100 including an adhesive tape 101 and an optical cable or fiber 102 is provided. The adhesive tape 101 secures the optical cable 102 to one or more walls or other similar planar or curved structures. In particular, optical cable unit 100 can be secured to walls 50 and 52 and can extend around a corner 54 formed between the walls. Unit 100 can be secured to any corner junction between any two surfaces or walls, including floors, ceilings, and vertical walls. The angle between the two surfaces or walls can be any angle, including ninety (or two hundred seventy) degrees.

Figures 3, 3A:
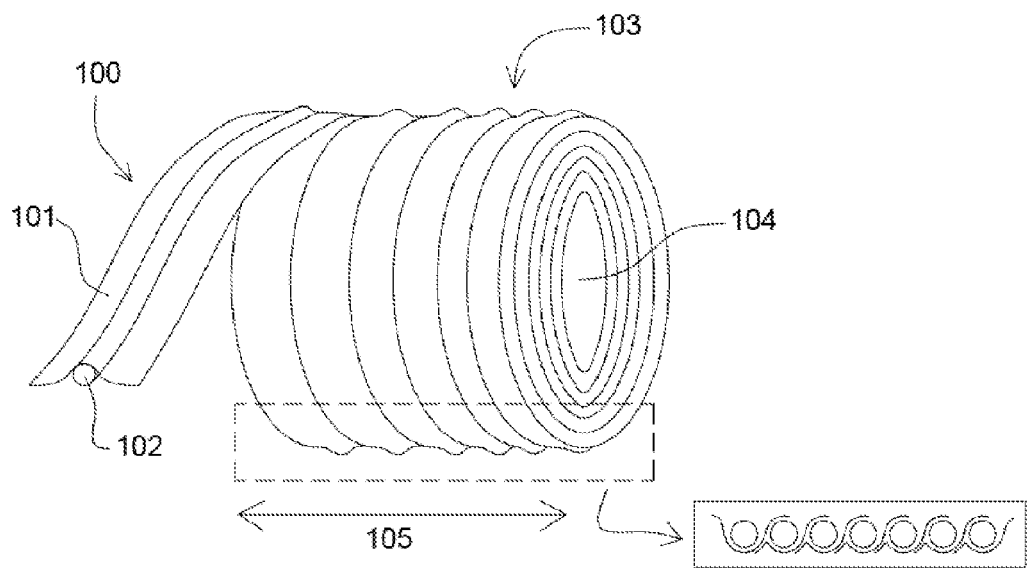
FIG. 3 is a perspective view of a spool of an embodiment of an optical cable unit.
FIG. 3A is a cross-sectional view of the optical cable unit shown in FIG. 3.
Figure 4:
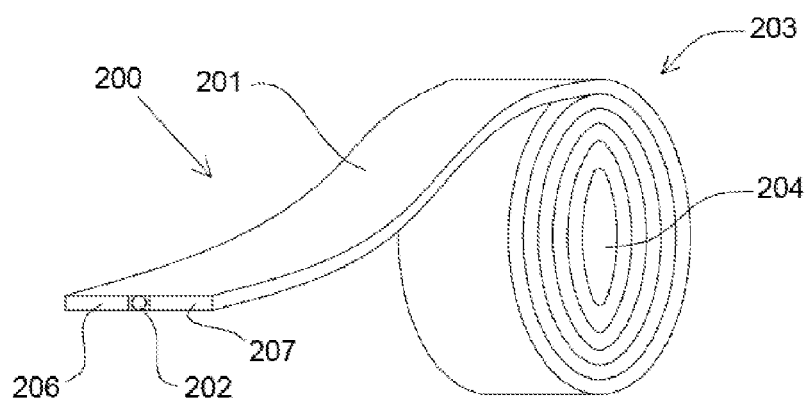
FIG. 4 is a perspective view of a spool of another embodiment of an optical cable unit.

Optical cable unit 100 can be configured in a variety of different ways, two of which are shown in FIGS. 3 and 4. In FIG. 3, optical cable unit 100 includes both tape 101 and cable 102, and can be preassembled into a spool 103. As the diameter or thickness of cable 102, which can generally be about 0.5 mm to 5 mm, is typically greater than the thickness of tape 101, the location of cable 102 along a cylindrically-shaped hub 104 of spool 103 can vary in a lateral direction 105 as unit 100 is wound around hub 104. Thus, cable 102 can take a generally helical path about hub. Among successive passes of optical cable unit 100 around hub 104, cable 102 may be wrapped around hub 104 such that each pass is shifted laterally by a distance equal to or greater than the diameter of cable 102 to reduce the overall profile and diameter of spool 103 when assembled with a length of unit 100. One cross-sectional view showing this configuration is more clearly depicted in FIG. 3A. In other variations, spool 103 can be provided without hub 104. The configuration of spool 103 is generally advantageous for cable that is about 2 mm to 3 mm in diameter, although other diameter cable can be used.

In another embodiment, an optical cable unit 200 includes an adhesive tape 201, an optical cable 202, and adhesive layers 206 and 207 each having a thickness similar to the diameter of cable 202. Adhesive layers 206 and 207 can be disposed laterally on either side of cable 202 and adhered to tape 201. Alternately, adhesive layers 206 and 207 can be part of tape 201 which can essentially be provided with a groove in which optical cable 202 is disposed. The location of cable 202 along the lateral width of tape 201 can be constant or can vary, and can be in the middle or nearer to one of the lateral edges of tape 201. Likewise, the size and positioning of adhesive layers 206 and 207 can vary accordingly. The configuration of optical cable unit 200 allows a spool 203 to be preassembled in much the same way as a conventional roll of tape is configured. A hub 204 may or may not be provided at the center of spool 203. The configuration of spool 203 is generally advantageous for cable that is about 0.5 mm to 0.9 mm, although other diameter cable can be used.

Figure 2:
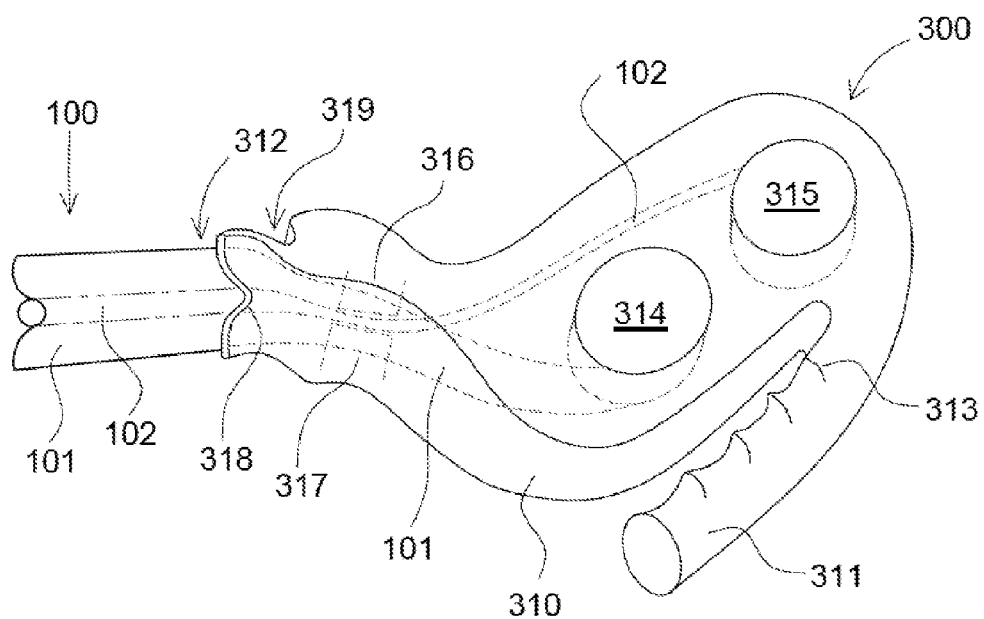
FIG. 2 is a perspective view of an embodiment of a tool for assembling and dispensing an optical cable unit.

In other embodiments, adhesive tape 101 and optical cable 102 can be assembled into optical cable unit 100 upon application to a wall or other surface. As shown in FIG. 2, a tool 300 for assembling optical cable unit 100 includes a housing 310 having a handle 311 and an outlet 312. Housing 310 may be made of a durable material, such as plastic, metal, or any other suitable material. Handle 311 can be positioned anywhere on tool 300 to allow for easy and ergonomic handling by the user. Handle 311 may also be provided with ridges 313 to assist in positioning the fingers of the user for secure handling. Housing 310 can be configured in a clamshell or other type of two-part or multi-part assembly, including two halves that allow access to the inner portion of housing 310, which includes a first post 314 and a second post 315. Posts 314 and 315 provide a location on which a spool or reel of adhesive tape and a spool or reel of optical cable can be provided for assembly. Tool 300 can be provided to the user already equipped with the appropriate spools of material, or can be loaded with the spools by the user.

Housing 310 further includes guide members 316 and 317, which are depicted adjacent outlet 312 but can be located anywhere between outlet 312 and posts 314 and 315. Guide members 316 and 317 are configured to assist in guiding cable 102 to the proper location with respect to tape 101. This location can be at the center or nearer to one of the lateral edges of tape 101. Guide members 316 and 317 can be stationary or can be configured to be moveable to provide flexibility to tool 300 for use in different capacities.

Outlet 312 is the location on tool 300 at which optical cable unit 100 exits tool 300. Outlet 312 includes a lip 318 on its upper edge that is generally configured to mirror the profile of optical cable unit 100. That is, as optical cable unit 100 is typically applied to a planar wall or surface, lip 318 is configured to take into account the differing thicknesses of tape 101 and cable 102 as they are assembled into the profile of optical cable unit 100, such that pressure can be applied evenly to optical cable unit 100 as it is applied to a wall or surface without providing excessive pressure to any one portion of optical cable unit 100, such as cable 102. Lip 318 can be made of or coated with any material, including materials such as silicon, rubber, or plastic that may slightly yield for an even greater and more even application of pressure. Lip 318 can be deformable in nature. Lip 318, including its lateral or side edges, can be configured in any manner or orientation so that the entire lip 318 fits the shape of the wall or surface to which unit 100 is applied, of course taking into account the profile of unit 100. The particular configuration of lip 318 provides the user with the ability to apply pressure to unit 100 as it is applied to the wall or surface with the assurance that the unit 100 will be successfully and securely adhered to the wall or surface, and that the optical cable will be protected and not damaged during application.

The bottom portion of outlet 312 includes an opening 319 at which optical cable unit 100 exits tool 300. Adjacent opening 319 can be a pad or soft surface (not shown) that can slide along the surface or wall. This allows the user to apply pressure to tool 300 against the surface or wall for even application of unit 100 without marking or altering the surface or wall. Outlet 312 may also include a blade or other cutting device (not shown) for cutting a portion of optical cable unit 100. Certain types of holders or other features to hold a lead end of optical cable unit 100 in a position to be initially applied to a wall or surface are also contemplated.

Alternatively, a spool such as spool 103 or 203 of a preassembled optical cable unit 100 can be provided with tool 300. The configuration of tool 300 provides for the application of optical cable unit 100 to a wall or surface even though its ability to assemble optical cable unit 100 may not be needed with a particular preassembled spool.

Figure 16:
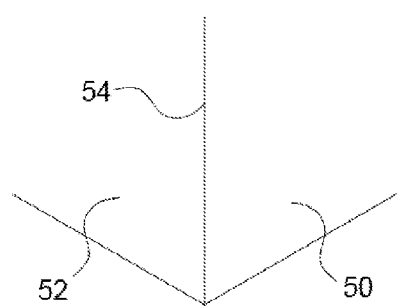
FIG. 16 is a perspective view of a corner between two walls.
Figure 17:
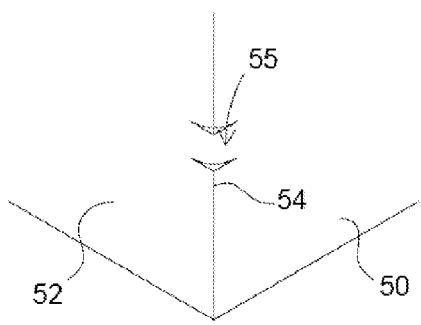
FIG. 17 is a perspective view of the corner shown in FIG. 16 prepared to accept an optical cable unit.
Figure 18:
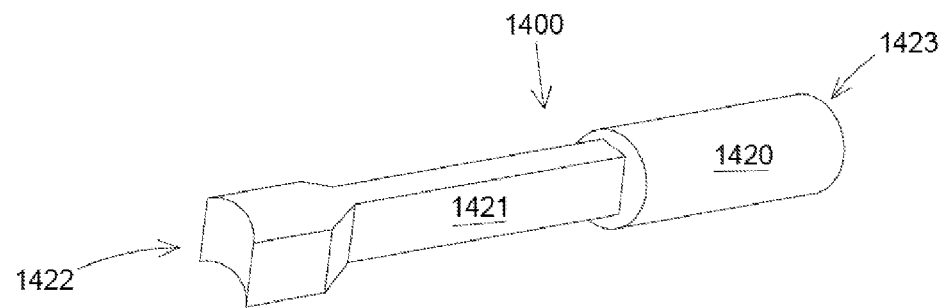
FIG. 18 is a perspective view of an embodiment of a tool used to prepare the corner shown in FIGS. 16 and 17.
Figure 19:
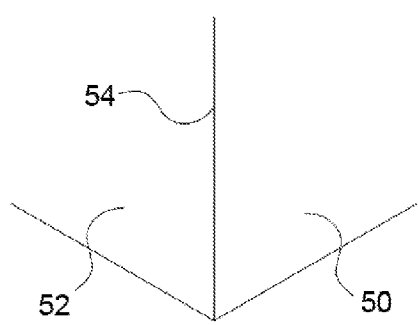
FIG. 19 is a perspective view of a corner between two walls.

A method of applying optical cable unit 100 to a wall or surface can include extending optical cable unit 100 around a corner 54 between two walls 50 and 52, as shown in FIGS. 16 and 17. In one method, a tool 1400, as shown in FIG. 18, is provided to prepare corner 54 to accept optical cable unit 100. Tool 1400 includes a handle 1420, a shaft 1421, and a curved tool end 1422. Curved end 1422 includes a cylindrical tooling surface defined about a radius of 5 mm. This particular radius has been determined to be advantageous in that it is large enough to allow for a smooth and acceptable bending of cable 102 along the resulting curve. Of course, other radii could be used.

Handle 1420 has an impaction end 1423 opposite shaft 1421 that is sturdy enough for impaction by a hammer or mallet. Shaft 1421 and curved end 1422 are preferably constructed of a rigid material, such as metal, hard plastic, or the like. Handle 1420 can be constructed of the same material or may be comprised of a softer material for purposes of handling. Handle 1420 may be an entirely separate material and assembled to shaft 1421, or more preferably, can comprise a softer material wrapped around an extension of shaft 1421, which can terminate into impaction end 1423 to be struck by the hammer.

Tool 1400 is used to prepare corner 54 by placing curved end 1422 of tool 1400 against the surface of corner 54, and striking impaction end 1423 with a force sufficient enough to form an indentation 55 in corner 54, as shown in FIG. 17. The amount of force needed to create indentation 55 will be understood by the user based on the strength of the material of tool 1400 and the material of walls 50, 52 and corner 54. Typically, walls 50 and 52 are comprised of drywall, which will yield under light or moderate pressure from a metal tool. However, corner 54 may be reinforced with stronger materials and may require additional force to create indentation 55. Tool 1400 can be struck multiple times as necessary to create indentation 55. Of course, tool 1400 may not need to be struck and may simply be pressed against corner 54 by the user.

Preferably, tool 1400 is oriented such that curved end 1422 creates a smooth, rounded transition between walls 50 and 52. Of course, the radius of the curved transition of indentation 55 will mirror the radius or other profile of curved end 1422 of tool 1400. Accordingly, multiple tools or attachment heads for a universal tool having differently sized and shaped curved ends can be provided for a user to accommodate many different types of scenarios, including different cable sizes, different wall materials, different corner angles in walls, etc.

Figure 21:
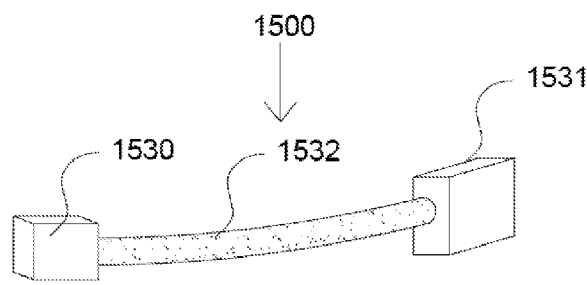
FIG. 21 is a perspective view of another embodiment of a tool used to prepare the corner shown in FIGS. 19 and 20.

In another method, a tool 1500 is provided to prepare corner 54. As shown in FIG. 21, tool 500 includes holders 1530 and 1531 on separate ends of an abrasive cable 1532. Cable 1532 can be made of an abrasive material or can be made of a separate material wrapped in an abrasive coating or paper, such as sand paper. In any construction, abrasive cable 1532 should be comprised of one or more materials with enough strength to withstand the tension applied during the present method of use. Holders 1530 and 1531 are shown in a block-like configuration, but can take on any configuration such that they can be gripped easily by the user and are securely connected to cable 1532. The diameter of cable 1532 should be substantially equal to or more preferably slightly larger than the cable of the optical cable unit to be applied to the wall.

Figure 20:
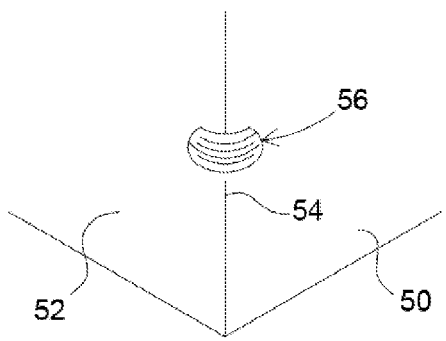
FIG. 20 is a perspective view of the corner shown in FIG. 19 prepared to accept an optical cable unit.

Tool 1500 is used to prepare corner 54 by placing abrasive cable 1532 against the portion to be rounded and by moving cable 1532 laterally back and forth against corner 54 to "sand" down corner into an indentation 56 shown in FIG. 20. Indentation 56 is similar in nature to indentation 55 discussed above, but of course will take on the tubular or cylindrical profile of cable 1532. Indentation 56 could also be formed by twisting cable 1532 against corner 54.

Once an indentation is provided around corner 54 of walls 50 and 52, optical cable unit 100 can be applied to walls 50 and 52 such that cable 102 is positioned within indentation as tape transitions around corner 54 from one wall to the other. The prepared indentation will help to protect cable 102 from being bent along too small a radius, which will therefore help to maintain the integrity and transmissivity of cable 102.

Tool 300 can be used during the application of optical cable unit 100. Handle 311 of tool 300 can be gripped by the user, and once the lead end of optical cable unit 100 is adhered to a wall, tool 300 can be moved along wall in a manner similar to the application of tape from a conventional tape gun. Lip 318 of outlet 312 of tool helps to ensure optical cable unit 100 is properly and securely adhered to walls 50 and 52. Of course, the user can further ensure the application of optical cable unit 100 by smoothing tape 101 to the wall and or cable 102 after application through use of tool 300, or during application with the use of the users other hand. The geometry of corner 54 and the indentation in same make it preferable that the user ensure the adhesion of optical cable unit 100 particularly in these areas after applied. Tool 300 can be used to cut or sever optical cable unit 100 at the trailing end once the proper amount of optical cable unit 100 has been applied.

As indicated above, optical cable unit 100 can be secured to any corner junction between any two surfaces or walls, including floors, ceilings, and vertical walls. This includes corner junctions that form convex structures, such as the corner junction shown in FIG. 1 which forms an angle of approximately 270 degrees, and also corner junctions that form concave structures which form an angle of approximately 90 degrees. The flexibility of the present invention allows it to be used with essentially any particular angle between the two surfaces or walls. Optical cable unit 100 can also be installed on a flat, planar, or curved surface that does not include a particular corner junction.

Figure 5:
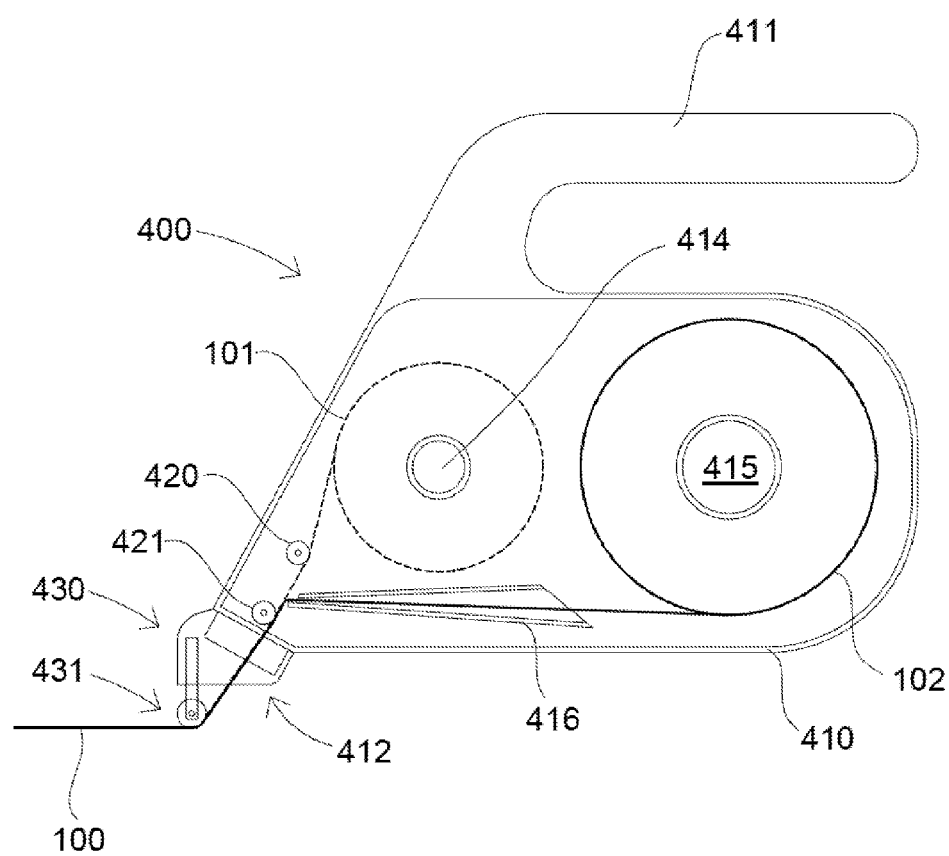
FIG. 5 is an elevational view of another embodiment of a tool for assembling and dispensing an optical cable unit.

A tool 400 is shown in FIG. 5 and is another embodiment for assembling and securing optical cable unit 100 to one or more surfaces. Tool 400 includes many of the same attributes of tool 300 as described above, and includes a housing 410 having a handle 411 and an outlet 412. Housing 410 can include in its inner portion a first post 414 and a second post 415, which provide locations for a spool of material, such as adhesive tape or optical cable, to be provided for assembly.

Housing 410 further includes a guide member 416 positioned between outlet 412 and post 415. Guide member 416 is in the form of a tapered funnel structure and can take on any other form as necessary to perform its function. Guide member 416 may also be comprised of two or more separate members that perform the same function. Guide member 416 is configured to direct optical cable or fiber 102 from its spool located on post 415 and direct it toward adhesive tape 101, which is disposed on its spool on post 414. Basically, guide member 416 is configured to assist in guiding cable 102 to the proper location with respect to tape 101. Thus, guide member 416 can be larger or smaller, stationary or moveable, single or multiple parts to provide flexibility to tool 400 for use in different capacities. Rollers 420 and 421 are positioned adjacent outlet 412 and aid in moving and guiding both cable 102 and tape 101. Of course, fewer or additional rollers can be used as necessary.

Optical cable unit 100 exits tool 400 at outlet 412. Tool 400 is configured to be used with a detachable head 430 secured to tool 400 adjacent outlet 412. Head 430 includes an adjustable securing portion 431 that aids in securing optical cable unit 100 to one or more surfaces as unit 100 exits tool 400. In many embodiments that will be described below, head 430 is selectively attachable to housing 410. However, the elements and characteristics of head 430 that are herein described can be included as aspects of a permanent feature on housing 410.

Figure 6A:
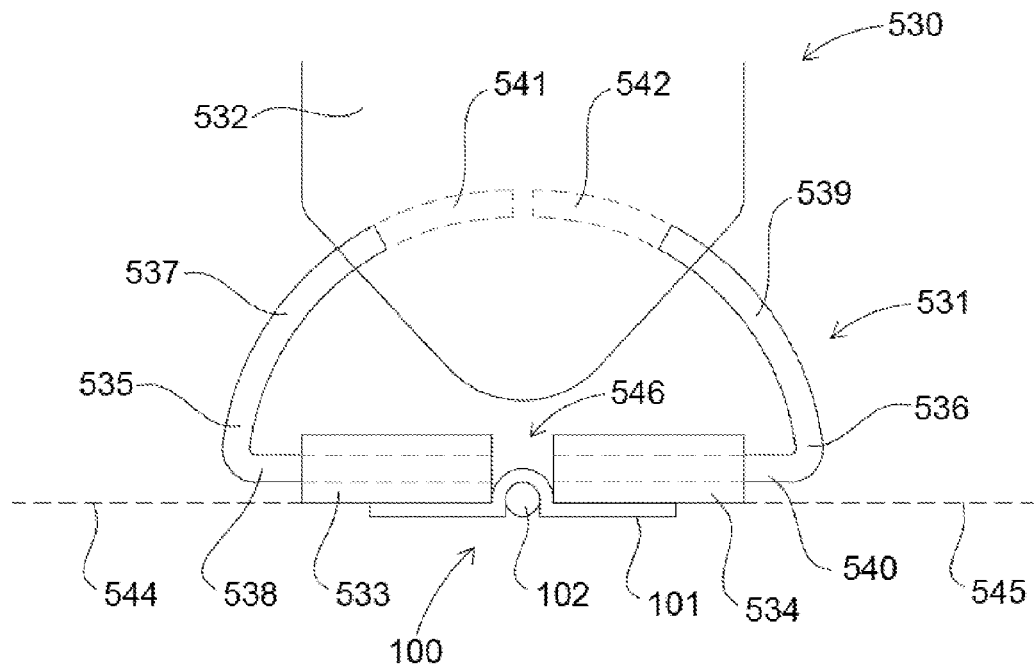
FIGS. 6A and 6B are plan views of an embodiment of a detachable head configured for use with the tool shown in FIG. 5.
Figure 6B:
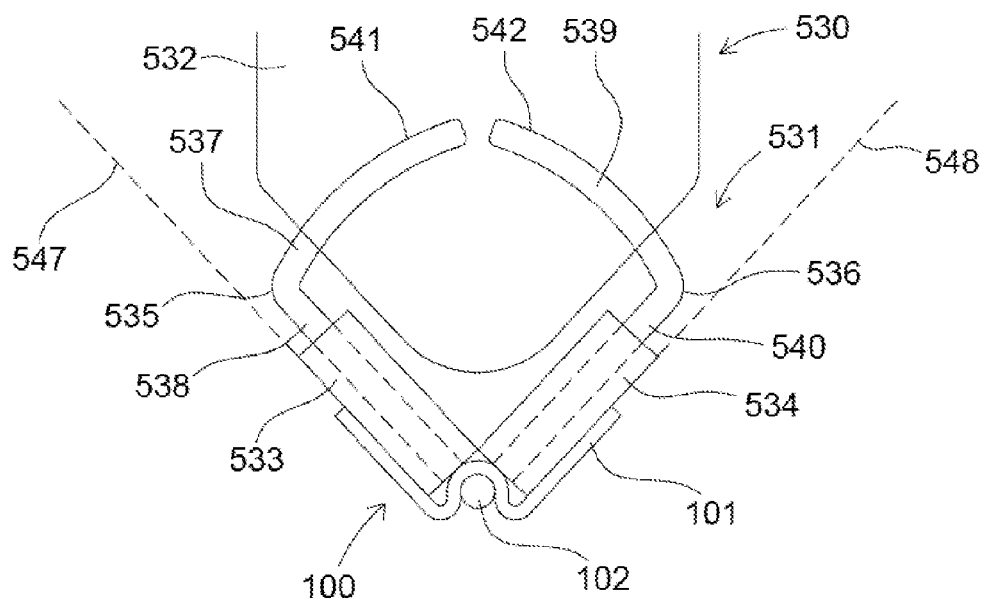

An embodiment of a detachable head 530 is shown in FIGS. 6A and 6B. Head 530 includes an adjustable securing portion 531 operable with a base portion 532, which is configured to connect with housing 410 at outlet 412. The connection between base portion 532 and housing 410 should be secure and substantially rigid, and the actual configuration of the connection can be of any type known in the art that provides such a connection. Of course, head 530 can be adapted to be attachable with multiple different housings.

Adjustable securing portion 531 includes first and second surface portions 533 and 534 that are configured to be positioned in and to adjust between a first position shown in FIG. 6A and a second position shown in FIG. 6B. In the embodiment of detachable head 530, substantially cylindrical rollers 533 and 534 as first and second surface portions are disposed on first and second supports 535 and 536, respectively. Supports 535 and 536 are provided separately from one another. Support 535 includes a first extension 537 and a second extension 538, with first extension 537 being engageable with a channel 541 in base portion 532, such as by the extension 537, which may be hollow, being moved over and receiving the channel 541 therein or by the channel 541, which may be hollow, receiving the extension 537 therein. Likewise, support 536 includes a first extension 539 engageable with a channel 542 and a second extension 540. In that way, supports 535 and 536 can move between the first position in which they are extended outward from the base portion 532, as shown in FIG. 6A, and the second position in which they are retracted into base portion 532, as shown in FIG. 6B. Rollers 533 and 534 are thusly moved from the first position to the second position through the movement of supports 535 and 536. The attachment between first portions 537 and 539 and channels 541 and 542 can be based on their curved geometries as shown in FIGS. 6A and 6B, or additional features can be used to guide, move, and/or restrain supports 535 and 536 and the base portion 532.

Roller 533 is disposed about section extension 538, which is substantially axial or linear in nature to allow roller 533 to rotate about second portion 538. The same configuration is provided between roller 534 and second extension 540. Thus, section extensions 538 and 540 act as axles on which rollers 533 and 534 are mounted for rotation. Rollers 533 and 534 can be made of or coated with any material, including materials such as silicon, rubber, or plastic that may slightly yield for an even greater and more even application of pressure, and can be deformable in nature.

As shown in FIG. 6A, detachable head 530 is in a resting state in its first position in which supports 535 and 536 are extended outward from the base portion 532. Although not shown, springs can be provided in channels 541 and 542 to bias adjustable securing portion 531 into the resting state. In the first position, rollers 533 and 534 provide first and second surface portions that form a first angle 543 therebetween. First angle 543 (not referenced in FIG. 6A) is substantially 180 degrees and extends between axis 544 of roller 533 and axis 545 of roller 534. In other words, axes 544 and 545 are parallel, and in this configuration, coaxial.

When detachable head 530 is connected with a housing, such as housing 410, it can be used to secure optical cable unit 100 to one or more surfaces as it is dispensed from housing 410. For instance, the surfaces can be two parallel surfaces, or alternately a single surface, that extend substantially along axes 544 and 545. As optical cable unit exits housing 410 and is disposed on the surface(s), rollers 533 and 534 can contact and roll along portions of tape 101 to press and further secure it to the surface(s).

As shown in FIG. 6A, rollers 533 and 534 are in contact with portions of tape 101, and are also spaced apart to form a gap 546 therebetween. Gap 546 is dimensioned to accommodate cable 102 and allows head 530 to apply pressure to tape 101 and to avoid any unnecessary or potentially harmful pressure to cable 102, with the result being a more secure attachment of optical cable unit 100 to the surface(s). It can be considered that gap 546 corresponds to some degree to a feature of lip 318 of tool 300, which is generally configured to mirror the profile of optical cable unit 100. As with tool 300, the particular configuration of head 530, and more specifically, of adjustable securing portion 531, provides the user with the ability to apply pressure to unit 100 as it is applied to the wall or surface with the assurance that the unit 100 will be successfully and securely adhered to the wall or surface, and that cable 102 will be protected and not damaged during application.

Depending on the configuration of the surfaces to which optical cable unit 100 is applied, adjustable securing portion 531 can be transitioned from the first position of its resting state into its second position, as shown in FIG. 6B. Of course, adjustable securing portion 531 could be transitioned to a position between the two depicted positions or beyond the position depicted in FIG. 6B. In the second position, first extensions 537 and 539 may, for example, be retracted into channels 541 and 542, respectively. Any springs provided in channels 541 and 542 may be compressed in such a position. The first and second surface portions of rollers 533 and 534 are then configured to form a second angle 549 therebetween. Second angle 549 (not referenced in FIG. 6B) extends between axis 547 defined by roller 533 and axis 548 defined by roller 534. As can be seen from FIGS. 6A and 6B, second angle 549 is different than first angle 543, and in particular, second angle 549 is less than first angle 543. Second angle 549 is depicted in FIG. 6B to be about 90 degrees.

The operability of detachable head 530 is such that adjustable securing portion 531 can be configured to transition from its first position to a second position in which second angle 549 is essentially any angle less than first angle 543. This transition can occur when adjustable securing portion 531 is forced into contact with one or more surfaces. Second angle 549 can thusly be dictated by the configuration of the surface(s) to which optical cable unit 100 is applied. That is, second angle 549 can be achieved that is substantially equal to an angle between two surfaces upon which optical cable unit 100 is dispensed and secured.

Head 530 can be used in connection with a tool, such as tool 400, to apply optical cable unit 100 to one or more flat or curved walls or surfaces. As head 530 is configured to be detachable or removable from housing 410, a particular head can be selected and attached adjacent outlet 412. Of course, tool 400 can include head 530 attached prior to use. Two or more different heads with different adjustable securing portions can be provided to the user, who can select one to be assembled with tool 400 prior to use.

A leading end of cable 102 can be passed through outlet 412 and aligned with tape 101 to form optical cable unit 100. Optical cable unit 100 can then be adhered to the surface(s). A user can manipulate tool 400 to press rollers 533 and 534, including their surface portions, against the surface(s) to cause adjustable securing portion 531 to transition from the first position (shown in FIG. 6A) toward the second position (shown in FIG. 6B). This can include moving rollers 533 and 534 against the bias of a spring mechanism (not shown in FIGS. 6A and 6B), which spring mechanism would otherwise force rollers 533 and 534 to assume the first position in a resting state. As any portion of supports 535 and 536 or rollers 533 and 534 encounter a surface, the response of the adjustable securing portion 531 is for that particular support 535 or 536 to retract so that first extension 537 or 539 moves further into its respective channel 541 or 542. Such movement of adjustable securing portion 531 is in response to a user manipulating tool 400 to press adjustable securing portion 531 against the surfaces.

The force required to move the aspects of adjustable securing portion 531 can vary. However, enough spring resistance should be maintained in order to allow rollers 533 and 534 to press firmly against the surface(s), or during use, against tape 101. This results in securing optical cable unit 100 to the surface(s) by pressing rollers 533 and 534 against tape 101 that is directly in contact with the surface(s). During application of optical cable unit 100, gap 546 between rollers 533 and 534 should be aligned with cable 102. Rollers 533 and 534 can then be rolled along tape 101 directly in contact with the surface(s) as optical cable unit 100 is dispensed.

Other embodiments of detachable heads are contemplated in accordance with the present invention. Their construction and operation is generally in accordance with that set forth above in connection with detachable head 530. In one particular embodiment shown in FIGS. 7A and 7B, a detachable head 630 is provided having a base portion 632 and an adjustable securing portion 631. Adjustable securing portion 631 includes rollers 633 and 634 that are disposed on first and second supports 635 and 636, respectively. Supports 635 and 636 are connected to one another at a location between rollers 633 and 634, where a post 650 of adjustable securing portion 631 is also connected. A first extension 637 and a second extension 638 make up support 635, with first extension 637 being connected directly to base portion 632. Support 636 is similarly constructed with a first extension 639 connected directly to base portion 632 and a second extension 640. Rollers 633 and 634 are spaced apart to form a gap 646 dimensioned to accommodate cable 102.

Certain connections between elements of head 530 are provided with flexible junctures. These flexible junctures are included at the locations where first extensions 637 and 639 are connected with base portion 632. They are also present at the connections between first extension 637 and second extension 638, first extension 639 and second extension 640, and the three-way connection of second extensions 638 and 640 and post 650. These flexible junctions act as hinges to allow for movement between the linked components. The construction of these junctions can be comprised of a narrowed portion of the material that comprises the connected components, which allows for greater flexibility, or by some other hinge or flexible material or construction. Head 630 may be constructed of a single material and formed into its final configuration, or may be made of separate components and thereafter welded, glued, or otherwise adhered together. Of course, the separate components themselves should not be as flexible, even if comprised of the same material.

Adjustable securing portion 631 is configured similarly to adjustable securing portion 531 described above, but operates in the reverse direction. That is, adjustable securing portion 631 is positioned in and can adjust between a first position shown in FIG. 7A and a second position shown in FIG. 7B. In the first position, post 650 is extended outward (shown as downward in FIGS. 7A and 7B) from base 632. In the second position, post 650 is moved inward (or upward) into base 632. Rollers 633 and 634 are thusly moved from the first position to the second position through the movement of supports 635 and 636, which are essentially driven by the location of post 650.

Figure 7A:
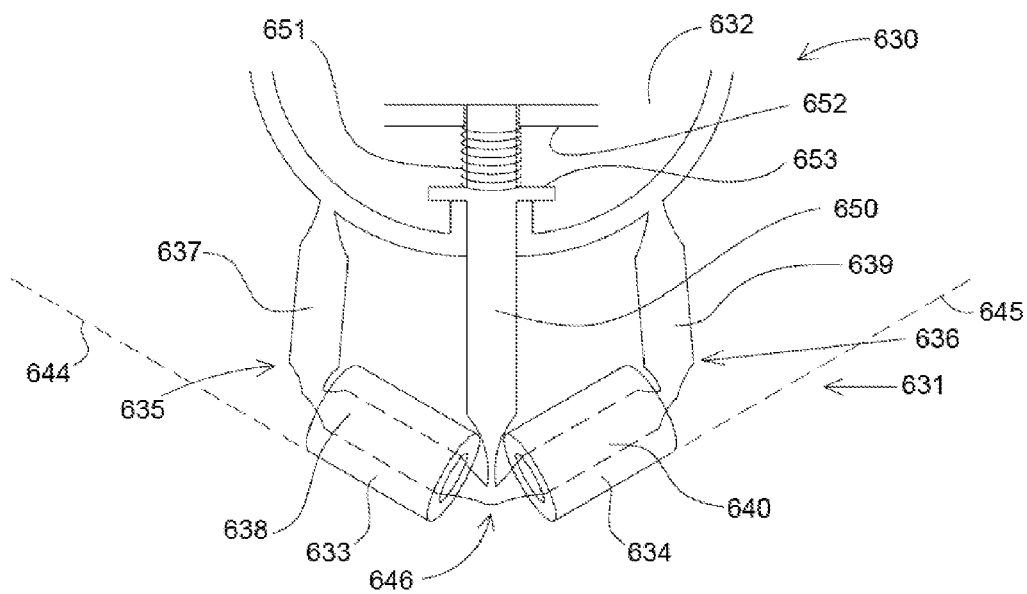
FIGS. 7A and 7B are plan views of another embodiment of a detachable head.

As shown in FIG. 7A, head 630 is in a resting state in its first position in which post 650 is extended outward from base 632 under the influence of a spring 651. Spring 651 is disposed about a portion of post 650 between a surface 652 of base 632 and a surface 653 on post 650. In the first position, rollers 633 and 634 provide first and second surface portions that form a first angle 643 (not referenced in FIG. 7A) therebetween. In the resting state of head 630, first angle 643 is substantially 90 degrees and extends between axis 644 of roller 633 and axis 645 of roller 634.

Figure 7B:
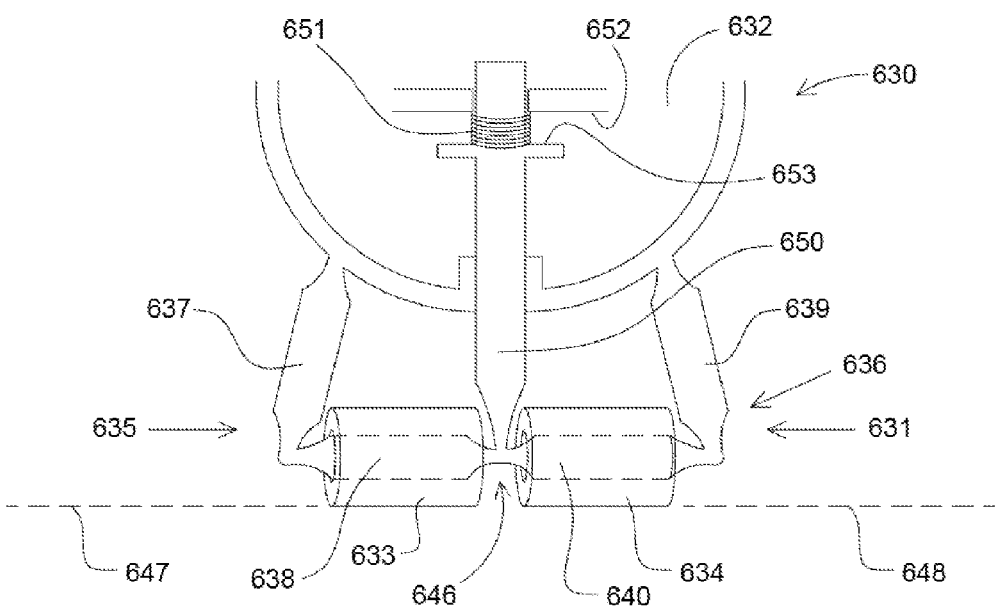

Adjustable securing portion 631 can be transitioned from the first position of its resting state into its second position, as shown in FIG. 7B. In the second position, post 650 is extended inward into base 632 against the influence of a spring 651. The first and second surface portions of rollers 633 and 634 are then configured to form a second angle 649 (not referenced in FIG. 7B) therebetween, which extends between axis 647 defined by roller 633 and axis 648 defined by roller 634. As can be seen from FIGS. 7A and 7B, second angle 649 is greater than first angle 643. Second angle 649 is depicted in FIG. 7B to be about 180 degrees. In other words, axes 644 and 645 are parallel, and in this configuration, coaxial.

It can therefore be seen that both head 530 and head 630 achieve a similar result of flexibility in their use with differently angled or configured surfaces. Head 530 begins its configuration such that the angle between its rollers 533 and 534, or surface portions, is substantially 180 degrees. The tool can be manipulated to reduce that angle as necessary. Oppositely, head 630 begins its configuration such that the angle between its rollers 633 and 634, or surface portions, is substantially 90 degrees. The tool can be manipulated to increase that angle as necessary. This occurs with only a slight differentiation in the method of using head 630 as compared to the method of using head 530.

As a user manipulates a tool configured with head 630, rollers 633 and 634 are pressed against one or more surfaces, which causes adjustable securing portion 631 to transition from the first position (shown in FIG. 7A) toward the second position (shown in FIG. 7B). Of course, the full second position may not be achieved as dictated by the surface(s). This can include moving post 650 against the bias of spring 651. As any portion of supports 635 and 636 or rollers 633 and 634 encounter a surface, the response of the adjustable securing portion 631 is for post 650 to move inward into base 632. This results in securing optical cable unit 100 to the surface(s) by pressing rollers 633 and 634 against tape 101 that is directly in contact with the surface(s). During this application, gap 646 should be aligned with cable 102. Rollers 633 and 634 can then be rolled along tape 101 directly in contact with the surface(s) as optical cable unit 100 is dispensed. Thus, the main difference between head 530 and head 630 is the configuration of the adjustable securing portion in its resting state. The same task can typically be completed with either head.

Figure 8A:
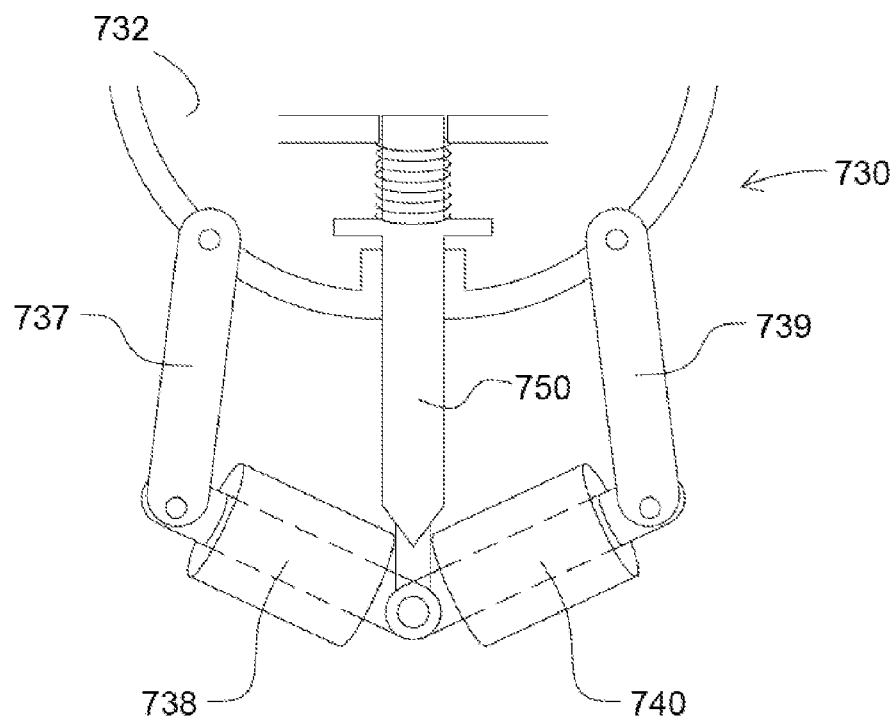
FIGS. 8A and 8B are plan views of another embodiment of a detachable head.
Figure 8B:
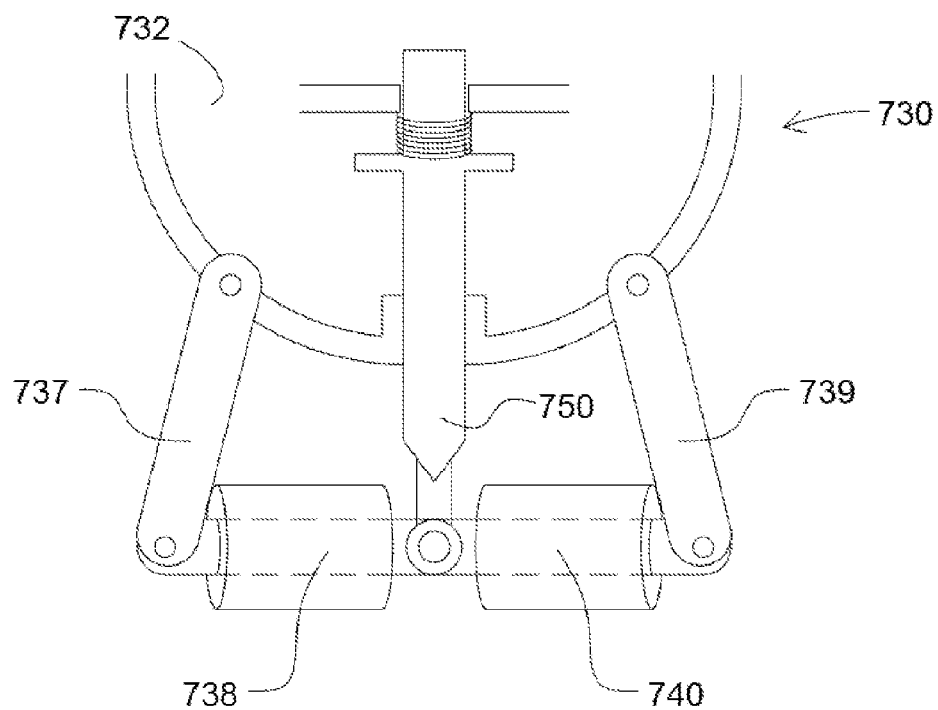

Another embodiment shown in FIGS. 8A and 8B is a detachable head 730, which is similar in most respects to head 630 described above. The main difference is that the flexible junctures of head 630 are replaced with hinges that rotate on pin connections between the respective elements. Hinges are located between first extensions 737 and base portion 732, first extension 739 and base portion 732, first extension 737 and second extension 738, first extension 739 and second extension 740, and the three-way connection of second extensions 738 and 740 and post 750. These hinges act similarly to flexible junctions to allow for movement between the linked components. Of course, the hinges can be configured to allow for more or less movement, or to be tighter or looser as necessary for the desired operation of the device. In other respects, head 730 is constructed and operates similarly to head 630.

Another embodiment is shown in FIGS. 9A-9D as detachable head 830, which is constructed somewhat similarly to head 530 but is biased using a different configuration. An adjustable securing portion 831 is operable with a base portion 832 configured to connect with housing 410 at outlet 412. As in head 530, rollers 833 and 834 are provided as first and second surface portions disposed on first and second supports 835 and 836, respectively. Support 835 includes a first extension 837 and a second extension 838, with first extension 837 being engageable with a channel 841 in base portion 832, similarly as described above. Likewise, support 836 includes a first extension 839 engageable with a channel 842 and a second extension 838.

Figure 9A:
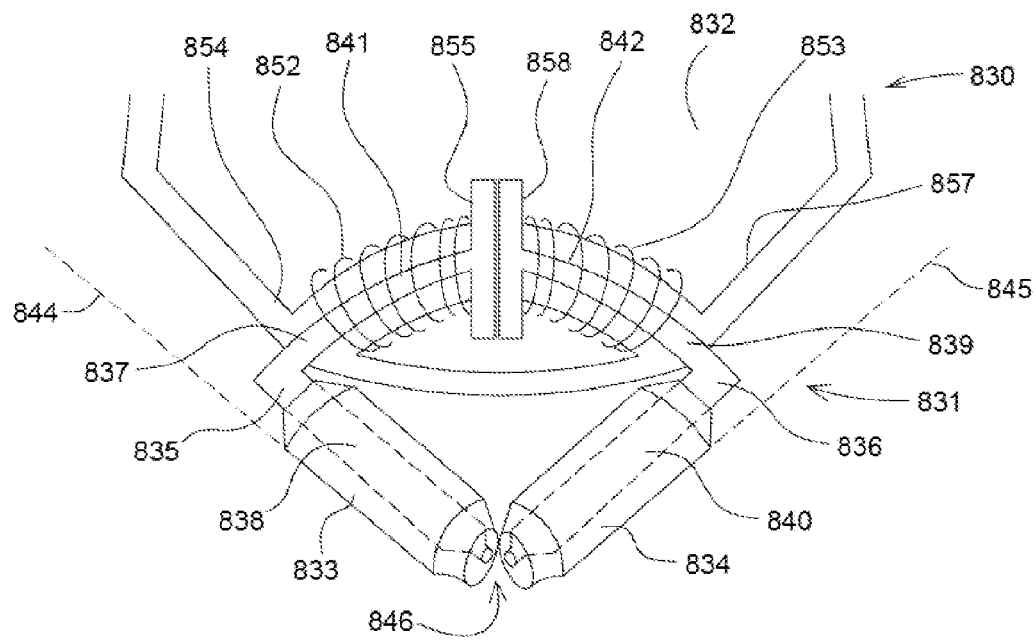
FIGS. 9A and 9B are plan views of yet another embodiment of a detachable head.

Different from head 530, channels 841 and 842 are formed within structures around which springs 852 and 853, respectively, are disposed. The effect of this configuration is that adjustable securing portion 831 is in its resting state in a first position shown in FIG. 9A in which a first angle 843 (not referenced in FIG. 9A) between the first and second surface portions of rollers 833 and 834 is less than a second angle 849 (not referenced in FIG. 9B) of a second position shown in FIG. 9B. First angle 843 extends between axis 844 defined by roller 833 and axis 845 defined by roller 834. First angle 843 is depicted in FIG. 9A to be about 90 degrees. Second angle 849 is substantially 180 degrees and extends between axis 847 of roller 833 and axis 848 of roller 834. In other words, axes 847 and 848 are parallel, and in this configuration, coaxial.

Figure 9B:
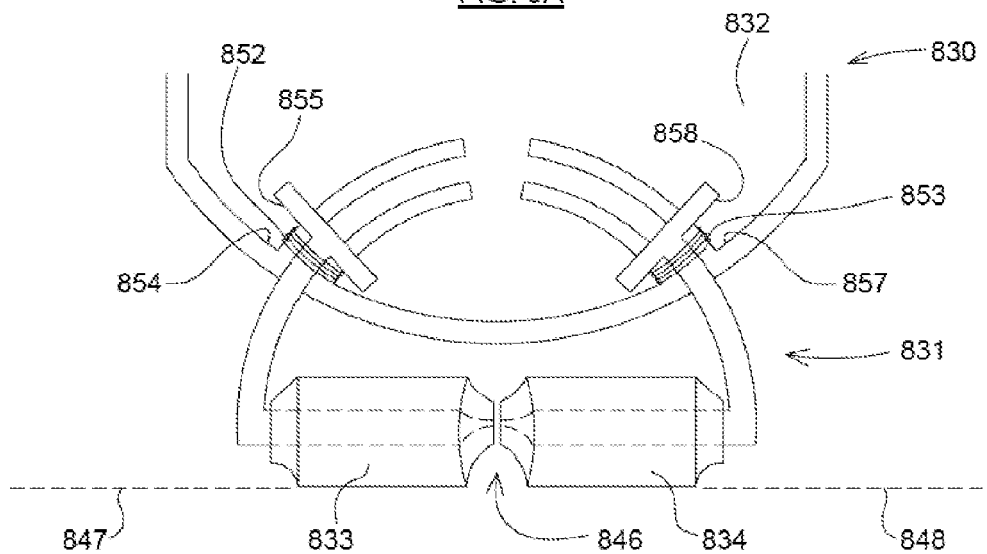
Figures 9C, 9D:
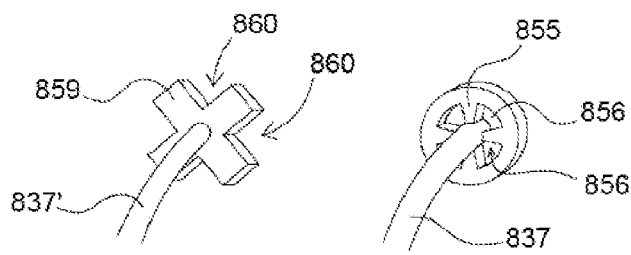
FIGS. 9C and 9D are perspective views of different configurations of an element of the detachable head shown in FIGS. 9A and 9B.

Spring 852 is disposed between a surface 854 of base portion 832 and a moveable surface 855 of first extension 837, shown more clearly in FIG. 9D. Moveable surface 855 is configured to include windows 856 that allow spokes of the structure around which spring 852 is disposed to pass. Thus, the spokes guide movement of first extension 837 and spring 852 biases support 835 into its resting state in a first position of adjustable securing portion 831. Spring 853 is configured in substantially the same way between a surface 857 of base 832 and a moveable surface 858 of first extension 839.

Supports 835 and 836 can be moved between the first position in which they are retracted into base portion 832, as shown in FIG. 9A, to the second position in which they are extended outward from the base portion 832, as shown in FIG. 9B, through an application of pressure against rollers 833 and 834 near gap 846 against one or more surfaces.

In an alternate configuration, a moveable surface 859 can be provided on a first extension 837', as shown in FIG. 9C. Windows 860 are configured more as channels that are open ended to guide spokes of the structure around which spring 852 is disposed to pass.

Figure 10A:
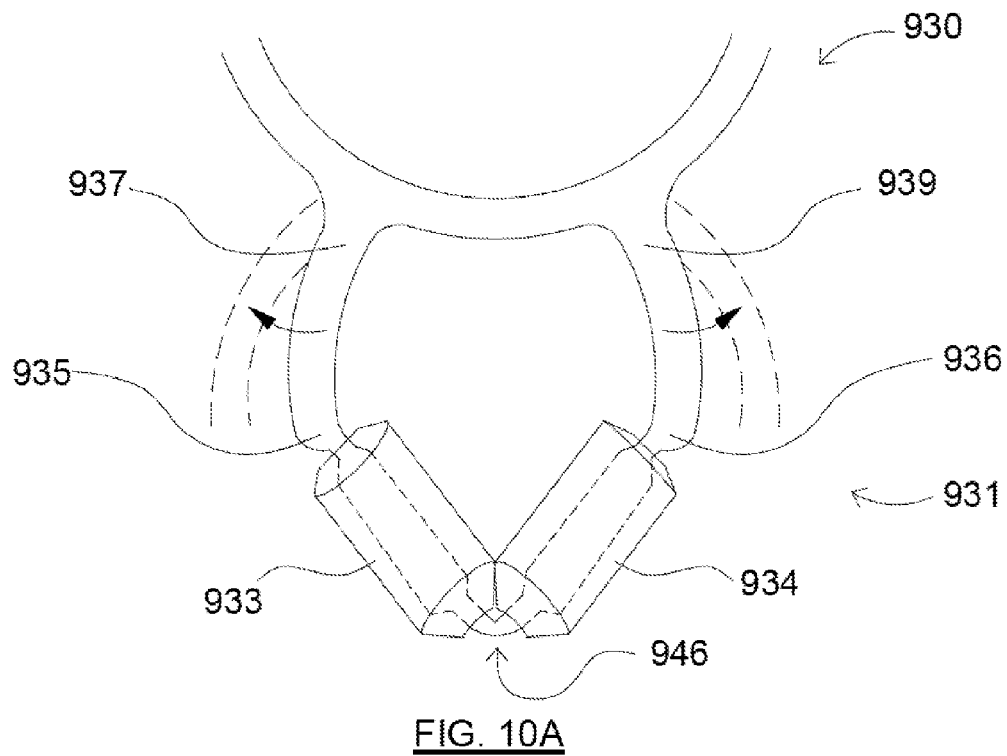
FIGS. 10A and 10B are plan views of another embodiment of a detachable head.
Figure 10B:
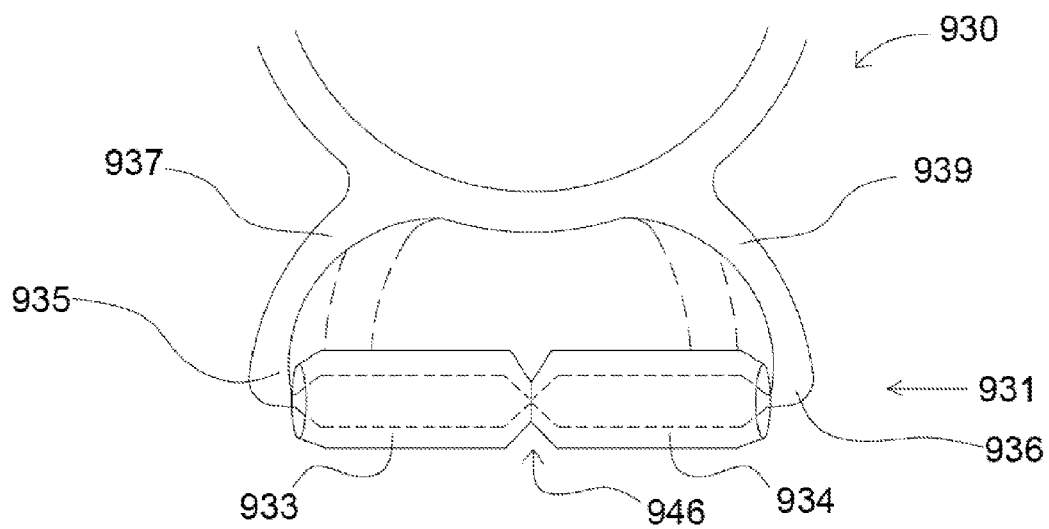

Another embodiment shown in FIGS. 10A and 10B is a detachable head 930, which is similar in most respects to heads 630 and 730 described above. The main difference is the absence of a post similar to post 650. Head 930 includes flexible junctures similar to those in head 630 to allow for movement between the linked components. The flexible junctures hold adjustable securing portion 931 in a first position shown in FIG. 10A in its resting state. Through an application of pressure against one or more surfaces against rollers 933 and 934 near gap 946, supports 935 and 936 can be moved between the first position (resting state) shown in FIG. 10A to the second position shown in FIG. 10B. During this transition, first extensions 937 and 939 flex away from each other, as shown by the arrows in FIG. 10A. This flexing of first extensions 937 and 939 allows for the elastic deformation of the components and their junctures to provide additional pressure against the adhesive tape on the surface(s). In head 930, a flexible juncture connection exists between supports 935 and 936 at gap 946.

Figure 11A:
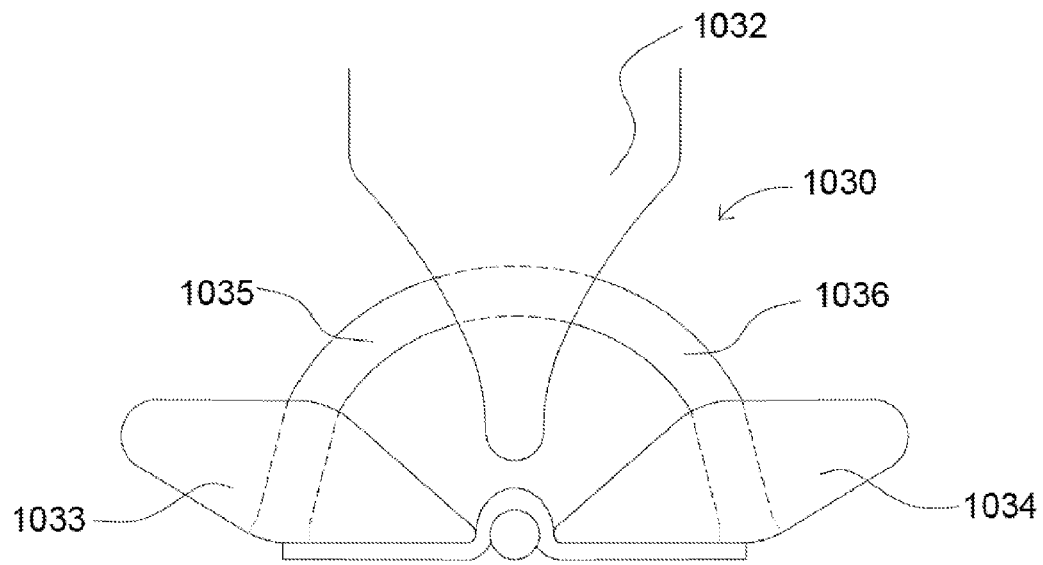
FIGS. 11A and 11B are plan views of still another embodiment of a detachable head.
Figure 11B:
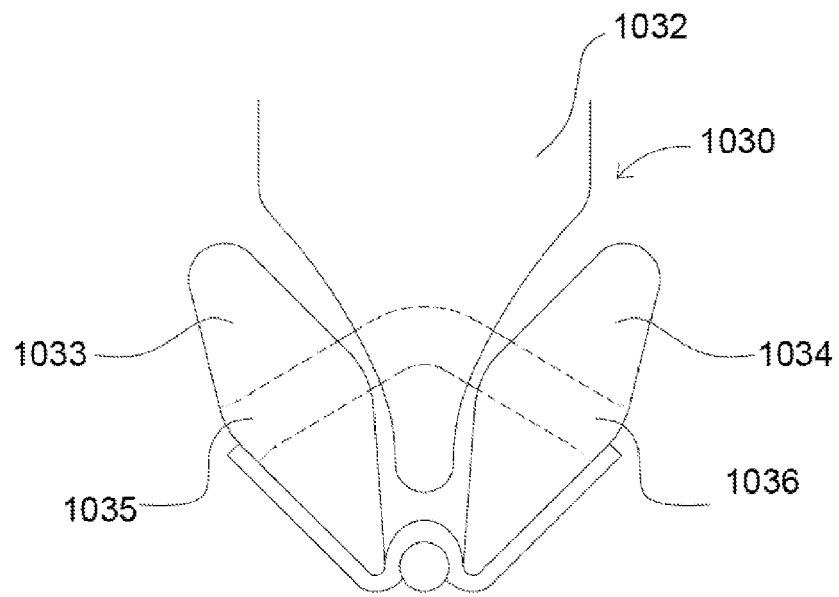

A further embodiment shown in FIGS. 11A and 11B is a detachable head 1030. The positioning and movement of head 1030 is similar in nature to that of head 530, although the configuration of supports 1035 and 1036 and rollers 1033 and 1034 is different. Namely, supports 1035 and 1036 extend toward the surface(s) at an angle that is more perpendicular to the surface(s) as opposed to parallel. Thus, rotation of rollers 1033 and 1034 occurs about supports 1035 and 1036, respectively, such that the first and second surface portions of rollers 1033 and 1034 pass over the portions of adhesive tape on the surface(s). Essentially, the surface of rollers 1033 and 1034 that contacts the adhesive tape can be said to rotate substantially within a plane of the tape or underlying surface. The particular rotation of rollers 1033 and 1034 is such that some relative movement, i.e. frictional movement, with the adhesive tape will occur. This contrasts with the configuration of head 530, where the rollers simply roll along the adhesive tape and do not create any frictional interaction with the tape. Supports 1035 and 1036 are extended from one another and from base 1032 in their resting state, as shown in the first position depicted in FIG. 11A. Supports 1035 and 1036 can compress toward one another, telescope into one another, or move in any other suitable manner when rollers 1033 and 1034 are pressed against a surface to assume the section position shown in FIG. 11B.

A system, such as in the form of a kit, can be provided including multiple of the above described embodiments for securing an optical cable unit to one or more surfaces. The system can include a housing having an outlet and at least two adjustable securing portions of detachable heads, each being selectively attachable to the housing at a position adjacent the outlet. Of course, any two or more of the above described adjustable heads, or any variations thereof, may be included in such a system. Essentially, the system may include a tool such as tool 400 (either with or without head 430), and any one or more adjustable heads. Additionally, one or more non-adjustable heads may be included, the adjustable securing portion of which is set at a fixed angle and not moveable between first and second positions. Such a system would allow a user of the tool to have access to a plurality of differently configured and operable detachable heads so that a tool according to the present invention could be used effectively regardless of the particular configuration of the surface(s) upon which an optical cable unit is installed.

While the first and second surface portions are herein depicted as rollers, such surface portions can be of any configuration that will allow for contact with the adhesive tape so that it can be supplied in a secure manner. The surface portions may be planar or curved pads. Any of the surface portions can be provided with a surface or coating of material that allows for smooth pressure to be applied against the adhesive tape without pulling, marring, scratching, or lifting the tape. One particular type of surface is that of felt or another low friction, soft material. Other types of frictional and non-frictional surfaces could be used as necessary. It is typically necessary for a roller to include a relatively higher level of friction to ensure that it grips the tape to cause and permit rolling of the roller. Of course, in some embodiments, the rollers need not roll to effectively secure the tape to the surface(s).

Figure 12:
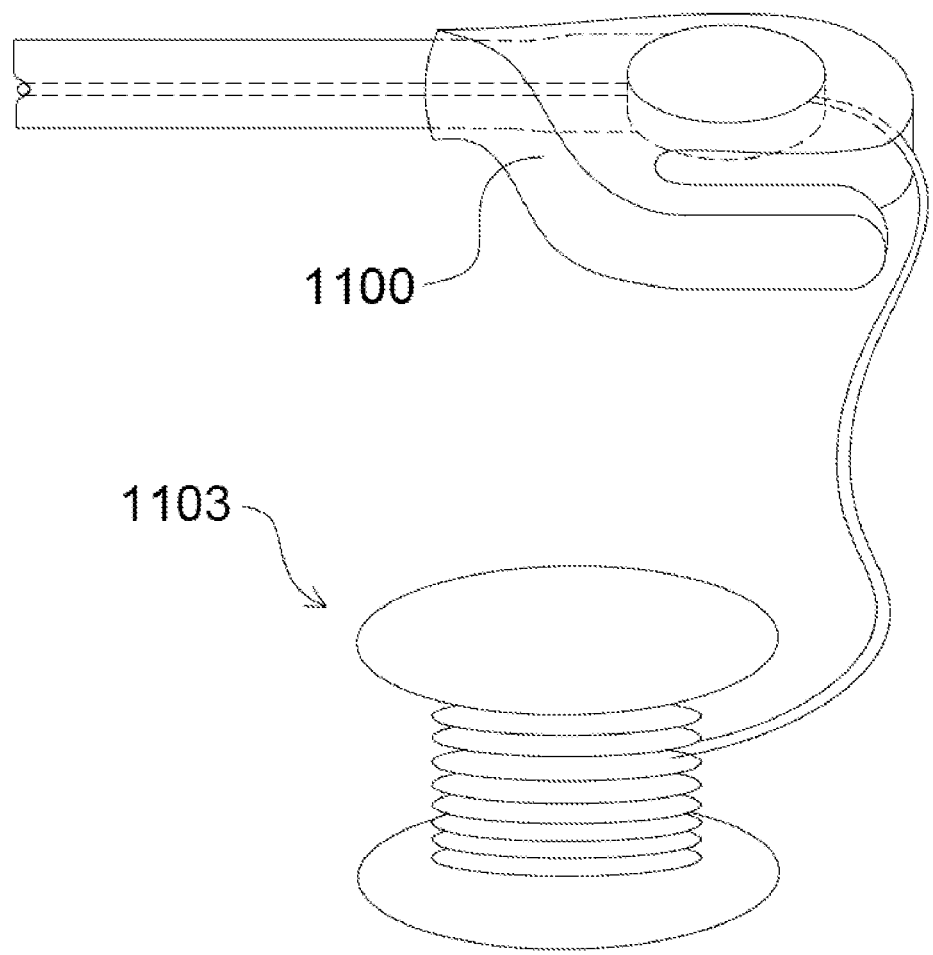
FIG. 12 is a perspective view of another embodiment of a tool for assembling and dispensing an optical cable unit and a separately provided spool of material.
Figure 13:
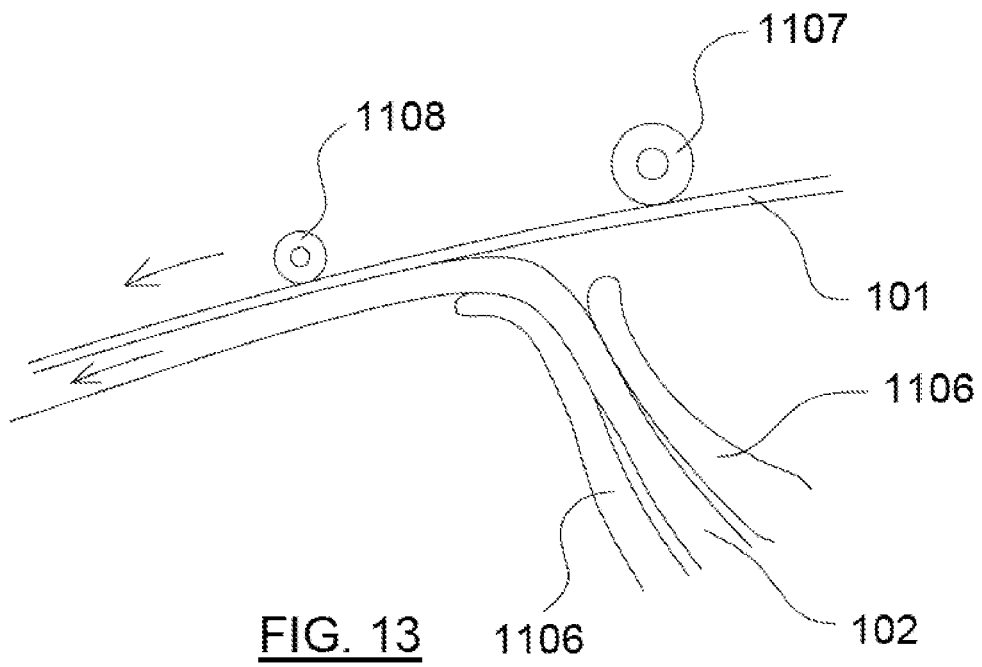
FIGS. 13 and 14 are views of an embodiment of a structure for introducing a material to the tool shown in FIG. 12.
Figure 14:
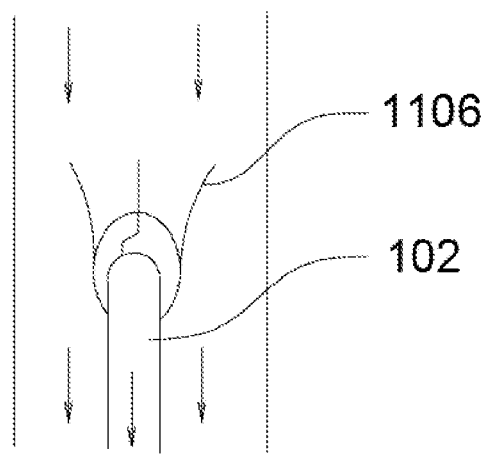
Figures 15, 15A:
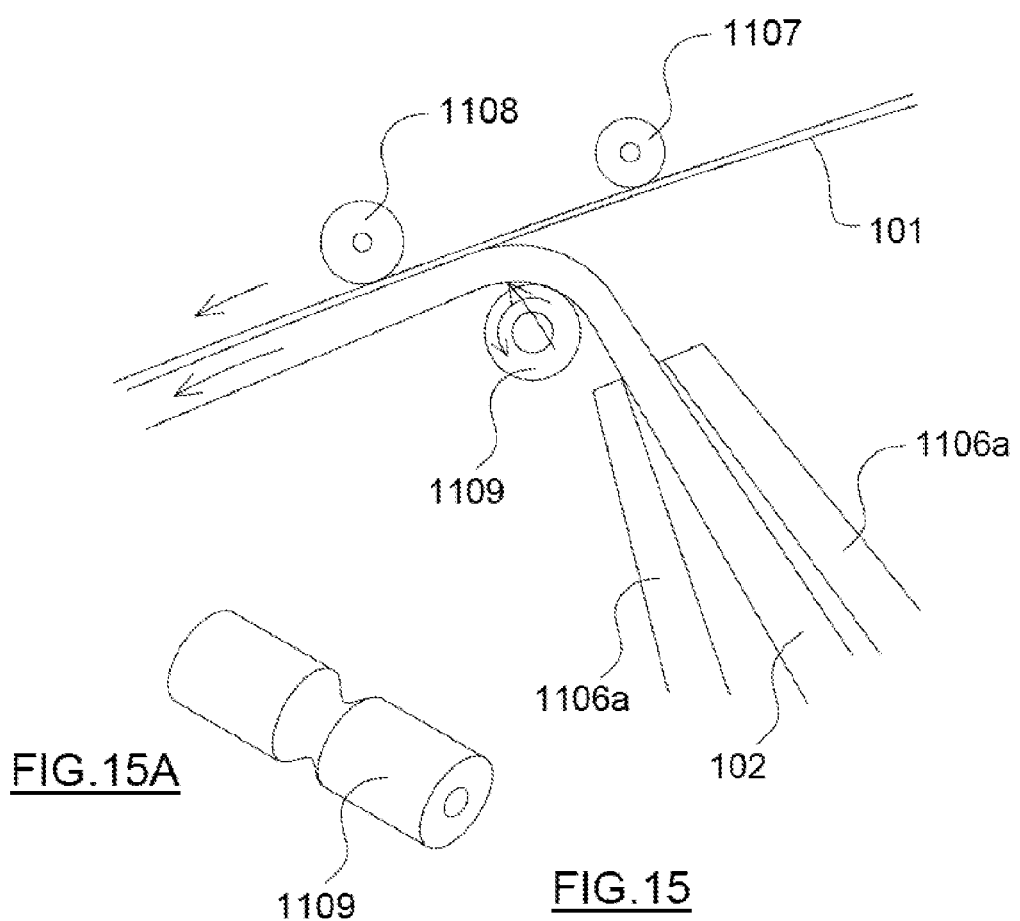
FIGS. 15 and 15A are views of another embodiment of a structure for introducing a material to the tool shown in FIG. 12

Although tool 400 is depicted herein as providing first and second posts 414 and 415 for holding spools of material, such as adhesive tape or optical cable, the size, quantity, and/or configuration of a spool of material may make it undesirable or impossible to contain the spool within housing 410. A tool 1100 is shown in FIG. 12 which accommodates a spool 1103 of material to be provided separately from tool 1100 such that the material of spool 1103 is accommodated by tool 1100. One embodiment of a structure for introducing a cable 102, for example, into tool 1100 is shown in FIGS. 13 and 14. A feeding portion 1106 essentially channels cable 102 into tool 1100. Feeding portion 1106 is similar in nature to guide member 416 of tool 400, discussed above. Cable 102 is fed into contact with adhesive tape 101, which may be advanced by rollers 1107 and 1108, similar in nature to rollers 420 and 421. In another embodiment, a feeding portion 1106a may deliver cable 102 about a channeled roller 1109 into contact with adhesive tape 101, as shown in FIGS. 15 and 15A. Any type of guide member or feeding portion described herein, or any structural variation thereof, can be provided in the tool to assist in feeding the tape and/or cable through the tool.

The particular sizes and dimensions described in the present application are exemplary, and other sizes and dimensions can be used with the embodiments. These dimensions include the size of the cable, the thickness and width of the tape, and the thickness and width of adhesive layers. For instance, optical cable is typically dimensioned to have a diameter from between 0.5 mm to 3 mm, although other diameters of cable can be used with the present embodiments. Of course, other types of cables and cords can also be used in accordance with the present invention as there may be a desire to adhere and/or protect such cable or cord in a manner as described herein. Further, the geometry of the indentation provided in the wall can be tailored to meet the requirements of the particularly sized and dimensioned optical cable.

The described embodiments and methods typically show that a detachable head can be configured to be positioned such that its surface portions are angled at or below 180 degrees. However, it is within the scope of the invention for a head to be configured to accommodate any particular angle greater than, equal to, or less than 180 degrees. In particular, any of the detachable heads described herein can simply be positioned to achieve such angles, or may be modified accordingly to achieve such angles.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended paragraphs.

The invention claimed is:

1. An apparatus for securing an optical cable unit to one or more surfaces, the optical cable unit including a length of adhesive tape and a length of optical cable, the apparatus comprising:

a housing including an outlet at which the adhesive tape can be provided for output from the housing; and an adjustable securing portion disposed adjacent the outlet for securing the optical cable unit to one or more surfaces, the adjustable securing portion having first and second surface portions configured to adjust between first and second positions, the first and second surface portions forming a first angle therebetween in the first position, and the first and second surface portions forming a second angle therebetween in the second position, the second angle being different from the first angle, wherein the first and second surface portions are spaced apart to define a gap therebetween, the gap being dimensioned to accommodate at least a portion of the cable wherein the first and second surface portions are substantially planar pads.

2. The apparatus of claim 1, wherein the firs angle is substantially 90 degrees and the adjustable securing portion is in the first position in a resting state.

3. The apparatus of claim 1, wherein the first angle is substantially 180 degrees and the adjustable securing portion is in the first position in a resting state.

4. The apparatus of claim 1, wherein the adjustable securing portion includes a spring mechanism to bias the first and second surface portions to assume the first position in a resting state.

5. The apparatus of claim 1, wherein the adjustable securing portion is configured to transition from the first position to the second position when the adjustable securing portion is forced into contact with one or more surfaces.

6. The apparatus of claim 5, wherein the second angle is substantially equal to an angle between two surfaces upon which the optical cable unit is dispensed.

7. The apparatus of claim 1, wherein the adjustable securing portion is selectively attachable to the housing.

8. A system for securing an optical cable unit to one or more surfaces, the optical cable unit including a length of adhesive tape and a length of optical cable, the system comprising:
   a housing including an outlet at which the adhesive tape can be provided for output from the housing; and
   at least two adjustable securing portions each being selectively attachable to the housing at a position adjacent the outlet for securing the optical cable unit to one or more surfaces, at least one of the adjustable securing portions having first and second surface portions configured to adjust between first and second positions, the first and second surface portions forming a first angle therebetween in the first position, and the first and second surface portions forming a second angle therebetween in the second position, the second angle being different than the first angle.

9. The system of claim 8, wherein a first of the adjustable securing portions has first and second surface portions configured to adjust between the first and second positions, and a second of the adjustable securing portions includes first and second surface portions forming a fixed angle therebetween of substantially 180 degrees.

10. The system of claim 8, wherein the first angle of a first of the adjustable securing portions is substantially 90 degrees and the first adjustable securing portion is in the first position in a resting state, and wherein the first angle of a second of the adjustable securing portions is substantially 180 degrees and the second adjustable securing portion is in the first position in a resting state.

11. An adjustable securing portion adapted for use with an apparatus for securing an optical cable unit to one or more surfaces, the optical cable unit including a length of adhesive tape and a length of optical cable, the adjustable securing portion comprising:
   first and second surface portions configured to adjust between first and second positions,
   wherein the first and second surface portions form a first angle therebetween in the first position, and the first and second surface portions forming a second angle therebetween in the second position,
   wherein the second angle is different from the first angle,
   wherein the adjustable securing portion is selectively attachable to the apparatus for securing the optical cable unit to one or more surfaces,
   wherein the first and second surface potions are spaced apart to define a gap therebetween, the gap being dimensioned to accommodate at least a portion of the cable,
   wherein the first and second surface portions are portions of first and second substantially cylindrical rollers, respectively, and
   wherein the adjustable securing portion includes first and second axles on which the first and second substantially cylindrical rollers, respectively, are mounted for rotation.

* * * * *

UNITED STATES PATENT AND TRADEMARK OFFICE
CERTIFICATE OF CORRECTION

PATENT NO. : 8,839,837 B2  
APPLICATION NO. : 13/352688  
DATED : September 23, 2014  
INVENTOR(S) : Kenichiro Takeuchi and Haiguang Lu Page 1 of 1

It is certified that error appears in the above-identified patent and that said Letters Patent is hereby corrected as shown below:

Claims

Column 16, line 28, Claim 11, delete "potions" and insert therefor --portions--.

Signed and Sealed this
Tenth Day of November, 2015

Michelle K. Lee
*Director of the United States Patent and Trademark Office*